(12) United States Patent
Nichols (10) Patent No.: US 7,333,504 B2
(45) Date of Patent: Feb. 19, 2008

(54) SIMULTANEOUS SERIAL TRANSMISSION OF MESSAGES WITH DATA FIELD ARBITRATION

(75) Inventor: Steven C. Nichols, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 1404 days.

(21) Appl. No.: 09/802,254

(22) Filed: Mar. 8, 2001

(65) Prior Publication Data

US 2002/0172211 A1    Nov. 21, 2002

(51) Int. Cl.
*H04L 12/403* (2006.01)

(52) U.S. Cl. ............... 370/447; 370/476; 370/503

(58) Field of Classification Search ........... 370/230, 370/235, 445, 446, 447, 448, 462, 468

See application file for complete search history.

(56) References Cited

U.S. PATENT DOCUMENTS

| | | | |
|---|---|---|---|
| 4,785,453 A | | 11/1988 | Chandran et al. ............... 371/68 |
| 5,022,046 A | * | 6/1991 | Morrow, Jr. ................. 375/130 |
| 5,105,441 A | | 4/1992 | Borst et al. ................... 375/17 |
| 5,175,821 A | | 12/1992 | Dutcher et al. .............. 395/275 |
| 5,303,348 A | | 4/1994 | Botzenhardt et al. ........ 395/325 |
| 5,391,970 A | * | 2/1995 | Chaffee et al. ............... 318/618 |
| 5,463,624 A | * | 10/1995 | Hogg et al. .................. 370/461 |
| 5,572,658 A | * | 11/1996 | Mohr et al. ..................... 714/4 |
| 5,689,510 A | * | 11/1997 | Jacquet et al. ............... 370/445 |

(Continued)

FOREIGN PATENT DOCUMENTS

EP    978964 A2 *   2/2000

(Continued)

OTHER PUBLICATIONS

Zanobini, A. et al., "Central Heating Control: A New Technique to Gauge Room Temperature," Instrumentation and Measurement Technology Conference, 1998. IMTC/98. Conference Proceedings. IEEE vol. 2, May 18-21, 1998. pp. 1079-1082.*

(Continued)

*Primary Examiner*—Chi Pham
*Assistant Examiner*—Donald L Mills

(57) ABSTRACT

A communication system has a number of nodes connected to a serial data bus. Nodes communicate with each other by transmitting dominant and recessive bits during bit intervals as taught by the CAN (controller area network) arbitration protocol. According to the CAN arbitration protocol, any dominant bit transmitted during a bit interval causes the bit value received to be a dominant bit regardless of the number of recessive bits being sent. The system is arranged so that two or more nodes each respond to a report query message sent by one of the nodes, with a report message sent simultaneously by each of the nodes. The headers (leading bits) of each of the report messages sent by nodes responding to a report query message are the same, allowing arbitration on a trailing node data field. This results in the message having the numerically largest (or smallest) node data field value to survive arbitration. Thus a number of nodes can be polled with a report query message and will respond by simultaneously sending each node's numerical data value with the largest or smallest of these data values received by the system's nodes.

10 Claims, 5 Drawing Sheets

QRL ENTRY FORMAT

U.S. PATENT DOCUMENTS

| | | | |
|---|---|---|---|
| 5,696,911 A | 12/1997 | Fredriksson | 395/286 |
| 5,805,614 A | 9/1998 | Norris | 371/37.02 |
| 5,812,556 A | 9/1998 | Schmidt | 371/3 |
| 5,987,554 A * | 11/1999 | Liu et al. | 710/310 |
| 6,243,778 B1 * | 6/2001 | Fung et al. | 710/113 |
| 6,654,355 B1 * | 11/2003 | Marbach et al. | 370/285 |
| 6,822,970 B1 * | 11/2004 | Redd et al. | 370/446 |

FOREIGN PATENT DOCUMENTS

WO    WO 9854872 A1 * 12/1998

OTHER PUBLICATIONS

Metrolho, J.C., et al., "CAN Based Actuation System for Greenhouse Control," Proceedings of the IEEE International Symposium on Industrial Electronics, 1999. ISIE '99. vol. 2, Jul. 12-16, 1999. pp. 945-950.*

Schofield, M. J., "Controller Area Network—How CAN works," pp. 1-5.*

Wu et al., "A new bus contention scheme in S/NET with dynamic priority," Parallel Computing 20, 1994, pp. 1041-1054.

* cited by examiner

SIMULTANEOUS SERIAL TRANSMISSION OF MESSAGES WITH DATA FIELD ARBITRATION

CROSS REFERENCE TO RELATED APPLICATIONS

These pending applications contain matter pertinent to this application:

"AC Synchronization With Miswire Detection for a Multi-Node Serial Communication System" having a common assignee with this application, having Ser. No. 09/658,794, and filed on Sep. 11, 2000 with John T. Adams, et al. as applicants, hereafter the "Miswire" application.

"Status Indicator For an Interface Circuit For a Multi-Node Serial Communication System" having a common assignee with this application, having Ser. No. 09/659,153, and filed on Sep. 11, 2000 with John T. Adams, et al. as applicants, hereafter the "Indicator" application.

BACKGROUND OF THE INVENTION

The powerful functionality and low cost of small, relatively powerful microprocessors and microcontrollers have resulted in their expansion into a variety of new uses. Where formerly microprocessors were used mainly for relatively complex tasks, their low cost now allows them to substitute at lower cost for simple or special purpose circuits formed of several discrete components. At the same time, their power allows them to handle additional functions in a particular application that discrete component circuits cannot.

One situation where this is particularly true is in distributed control or process management. Imagine a system where there are a large number of different functions that are performed at various locations throughout the system, and which functions must be coordinated with each other. Some of these functions are requests or initiations of actions, perhaps by a human, perhaps by another node in response to a detected condition. Others are the actions themselves.

The modern auto is a pertinent example. There are literally scores of different electrical functions that are initiated at various places throughout an automobile. A few of these functions are locking and unlocking doors, handling engine functions such as ignition and fuel injection, sensing and displaying status such as speed and oil pressure, indicating burned out lights and improperly closed doors, sensing accelerator and throttle position, etc. The conventional approach dedicates one or more conductors to each of these functions. For example, a wire directly connects a door lock with the switch that opens that lock, a wire connects the oil pressure gauge with the oil pressure sensor, a wire connects the door covering the fuel cap to the switch that opens it, and wires run from the ignition control to each of the ignition components. A moment's consideration shows that an automobile using such conventional connections of these related functions requires perhaps hundreds of dedicated wires.

This conventional structure has a number of disadvantages particularly in automated or semi-automated assembly. In the first place, failed or defective dedicated wires are expensive to correct. How can one easily run a replacement wire from the dashboard to the trunk? The large number of wires makes miswiring easy during manufacture not least because color-coding a large number of individual wires is complicated and expensive. The sheer number of wires connecting components located throughout the automobile becomes expensive to provide and install. The large number of wires occupies a significant volume within the auto. As the number of wires in an auto increases, the wires become increasingly vulnerable to damage or failure for a variety of reasons, leading to less reliability. Other systems both more complicated and less complicated than autos, have similar problems with handling the proliferation of functional elements and the wires between these various functional elements.

One solution to many of these problems makes use of the previously mentioned microprocessors. Instead of dedicated wires between related components, a single serial signal or data path often comprising a single pair of signal wires, and a single power wire pair are connected to all or at least a group of the system components. Each component includes a communicator or node that can send messages to and receive messages from the other components' nodes on the signal path. Each node receives every message on the signal wires and uses the messages appropriate for operating its component.

A problem recognized for a very long time is that of message collisions, where two or more nodes send messages on the signal wires at the same time. One solution is that of the CAN (controller area network) system. In the CAN system, messages are encoded in binary signals that are either dominant or recessive bits. If a node sends a dominant bit signal, the dominant bit is present on the signal path regardless of the number of recessive bits sent by other nodes. Each node senses the signal on the signal path, and ceases sending its message if, when sending a recessive bit, the node senses a dominant bit. This process of each node detecting collisions in real time and ceasing message sending upon detecting a collision is called arbitration. The CAN system is explained in more detail in U.S. Pat. Nos. 5,001,642 and 5,303,348.

Typically, each type of message has a unique leading ID portion. This assures that eventually only one message survives arbitration. The node sending the surviving message continues sending until the message is completed, at which time all of the nodes wait for a short period of time, and then as many as have messages to send, start sending new messages.

One problem with the CAN system is assuring that every node has an opportunity to complete its messages. CAN systems are designed to operate with cheap components and often in potentially noisy environments. It is possible to still have reliable communication under these conditions by using relatively slow bit rates, often on the order of a few hundred bits per second (bps). If the system also requires extensive real time data exchange, the data path may become fully occupied by messages having ID portions with dominant bits early in the message, and other messages will be delayed excessively. Accordingly, it is useful to reduce the number of messages in order to free the data path for as many messages as possible.

In some systems using the CAN system to communicate among the components, there are a number of components that are designed to provide a similar message at similar times. For example, if the system is a temperature control system for a relatively large occupied space, the system may have the space divided into zones, with a temperature sensor in each zone. Each of the temperature sensors will of course have its own node for communicating with the heating or air conditioning (HVAC) unit of the system. Typically, the highest or lowest temperature is used to determine whether the HVAC unit should operate. In typical larger installations, dampers or valves control flow from the HVAC unit of heated or cooled air or water to the various zones.

Since there may be a large number of zones, it can take some time for all of the nodes to report their zones' temperatures. When temperature is reported frequently, just the temperature reporting may comprise a substantial portion of the total message capacity on the data path. Furthermore, there is an advantage to learn immediately which of the zones is reporting to highest or lowest temperature. Since there is no way to predict which of the zones is coolest or warmest, this information is not available until each of the zones has reported. Furthermore, if this one piece of information is dependent on accurate transmission of a large number of messages, collisions and errors during transmission may delay final calculation of the extreme temperature value. From this analysis one can conclude that it is desirable to allow two or more nodes to simultaneously transmit. However, the CAN protocol is not designed to allow two messages to simultaneously transmit.

BRIEF DESCRIPTION OF THE INVENTION

I have developed a system for allowing a CAN-based system to simultaneously transmit messages each containing a digital data value such that the extreme one of the transmitted values can be determined at the end of one complete message. Such a system has at least first and second nodes for sending data on a shared serial data path. Each node uses dominant and recessive voltage signals to encode bit values, and has a send register recording the bits of a message to be sent. A message-sending module in each node responds to a send signal by sending on the data path during successive bit intervals the signal values specified by bit values in sequential bit positions of the send register. A dominant signal level sent on the data path by any node during a bit interval creates a dominant signal level on the data path during that bit interval irrespective of the number of recessive signal levels sent by other nodes. Each node while sending senses the signal level on the data path during each bit interval, and if the sensed signal level differs from that sent by that node, halts further sending of signal levels by that node. Each of at least first and second nodes generates a data signal associated with that node that encodes a node data value. The system includes a report query module providing a report query message signal to each of the first and second nodes. The report query message signal encodes a query data field having a value specifying a report message header value.

A message-generating module in each of the at least first and second nodes receives the report query message signal and the associated data signal. The message-generating module forms in a message assembly register a report message having as leading bits thereof a report message header specified by the query data field in the report query message signal. Each of the at least first and second nodes provides an identical report message header responsive to a particular query data field value. Each of the at least first and second nodes also provides as low order bits of the report message a series of bits encoding the node data value in the data signal generated by the node involved A message-synchronizing module in each node provides a synchronizing signal on the data path. Typically, the message-synchronizing module sends the synchronizing signal upon detecting the end of a message.

Each node has a message selection module that copies a report message assembled in the message assembly register into the send register, and responsive to the synchronizing signal, provides the send signal to the message-sending module.

In one embodiment each of the at least first and second nodes includes a memory for holding a send message queue into which the report messages are first copied after being formed. The message selection module copies each generated report message into the send message queue from the message assembly register. The message selection module selects individual messages from the send message queue, sequentially copies selected messages into the send register, and responsive to a synchronizing signal occurring thereafter, provides the send signal to the message-sending module.

The message-synchronizing module may comprise an end-of-message detector in electrical connection to the data path that provides the synchronizing signal responsive to the end of each message.

DESCRIPTION OF THE PREFERRED EMBODIMENT

The embodiment described here focuses on the specifics of the invention. This invention is integrated into a planned commercial system that has a number of other functions as well. Applicants can see no purpose in describing this entire system since this will greatly expand the length of the application and likely obscure to some extent the description of the invention. In general, this invention will form a part of a larger system for which the invention performs a part of the communication function. Applicants are confident that people skilled in these software and communication arts will find it easy to adapt the invention as described below into any desired system.

Figure 1:
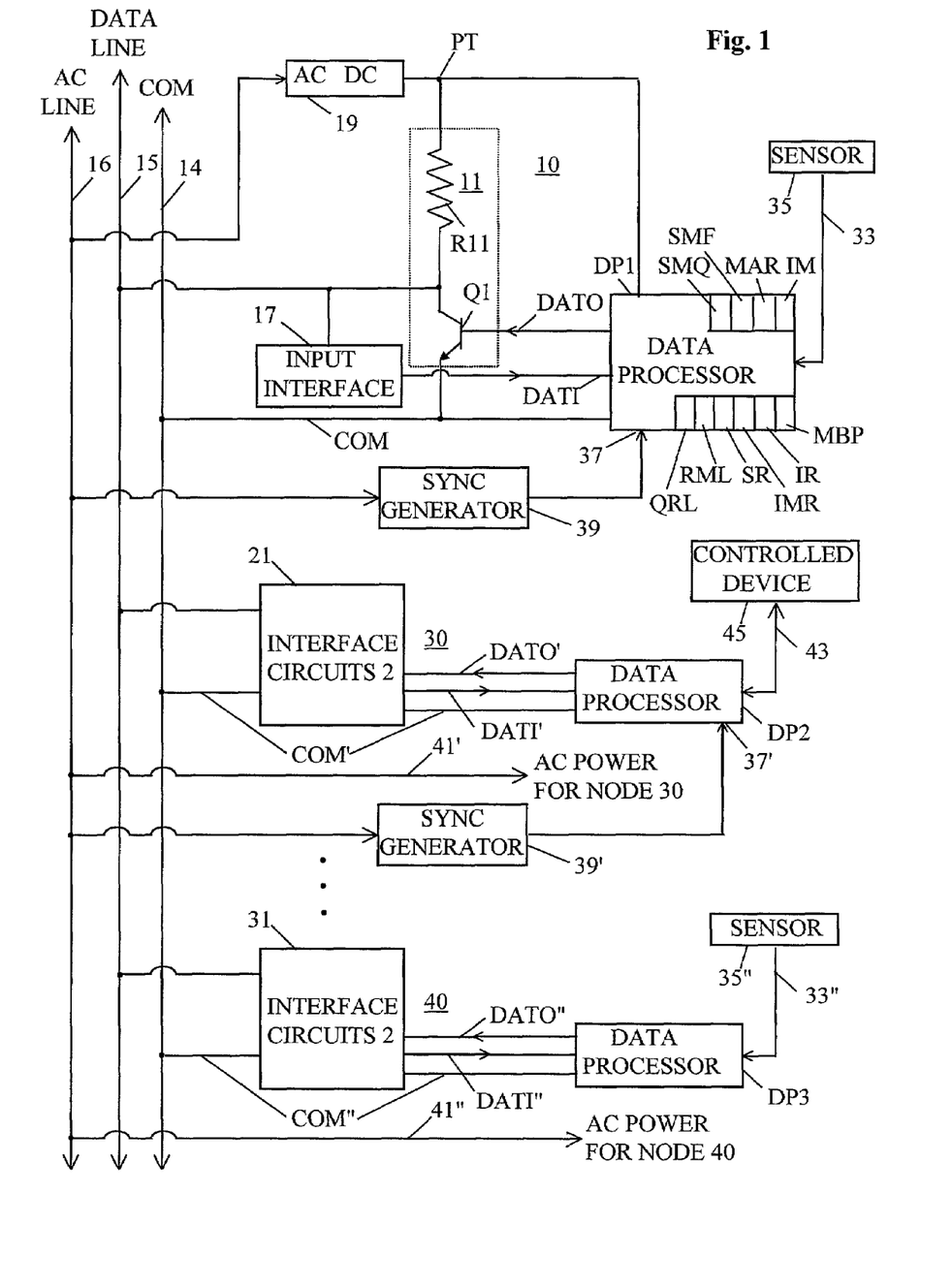
FIG. 1 is a hybrid block and circuit diagram showing a representative system employing the invention, and including a plurality of nodes having essentially identical communication features.

The block diagram of FIG. 1 shows three similar nodes 10, 30, and 40 of a serial communication system. Node 10 is shown in greater detail than are nodes 30 and 40. A typical system may have dozens of nodes similar to nodes 10, 30, 40. Some nodes will control mechanical or electrical devices such as a device 45 shown connected to a data processor DP2. Others, like node 10, have a data processor DP1 receiving a sensor signal from a sensor 35 on path 33. Some nodes may perform both data gathering and control functions.

In the embodiment here, all of the nodes 10, 30, etc. receive electrical power from an AC line 16 and a common line 14. In the commercial system for which this invention is intended, many of the devices controlled by the individual nodes operate on 24 v. AC power, so it is most convenient to use this available power for the nodes as well. And AC power has advantages in synchronizing operation of nodes 10, 30, etc. with each other. Further, using system-wide AC power distribution with a local AC to DC converter 19 in each node 10, 30, etc. provides further advantages in allowing miswiring detection as explained in the "Miswire" application. One can also use a single system AC to DC converter to provide system-wide DC power to each node on lines 14 and 16, but then the ability to synchronize all of the node operations to the AC signal will at the least likely require another timing line.

The nodes 10, 30, etc. are connected for data transfers to a serial data line 15 and the common line 14. As is typical, a series of voltage level changes across lines 14 and 15 encode the data to be transferred. In the CAN protocol explained above, one voltage level is designated as dominant, the other as recessive. In the embodiment of FIG. 1, a DC voltage near 0 v. relative to the common line 14 is the dominant level and a DC voltage of a few volts positive relative to line 14 is the recessive level.

Figures 2A, 2B, 3, 4:
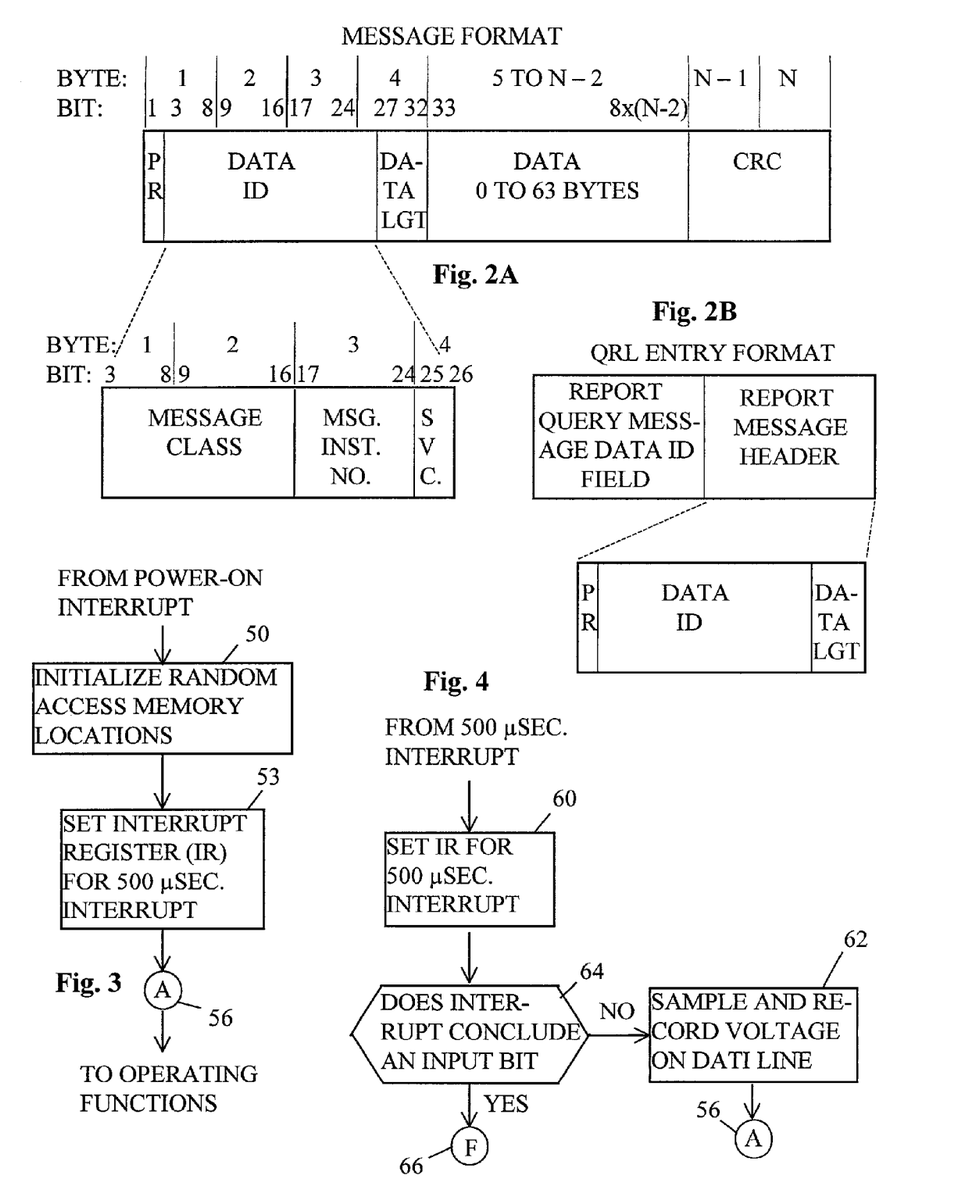
FIG. 2A shows the format of typical messages sent and received by nodes forming a part of the system of FIG. 1.
FIG. 2B shows the format of an entry in the query response list stored in each of the system's nodes.
FIG. 3 is a flowchart representing instructions executed during startup of the system of FIG. 1.
FIG. 4 is a flowchart representing instructions executed immediately after each 500 μsec. interrupt occurs.

Data is transmitted on line 15 in messages having in our commercial embodiment, a preselected message format shown in FIG. 2A. A message is transmitted serially, starting with the leftmost bit and proceeding bit by bit to the right. The individual fields of messages have the following names, sizes, and purposes:

| NAME | SIZE | MEANING/PURPOSE |
| --- | --- | --- |
| PR (Priority) | 2 bits | Message priority |
| DATA ID | 24 bits | Identifies content/purpose of message |
| DATA LGT | 6 bits | No. of total bytes in message |
| DATA | 0-63 bytes | Data carried by message |
| CRC | 2 bytes | Cyclic redundancy code for error detection |

The DATA ID field is further subdivided into the subfields shown:

| NAME | SIZE | MEANING/PURPOSE |
| --- | --- | --- |
| MESSAGE CLASS | 14 bits | Identifies type of data in the DATA field |
| MESSAGE INSTANCE NO. | 8 bits | System-specific information |
| SERVICE (SVC) | 2 bits | Defines message type: 00-Report Query, 01-Report, 10-11-other |

Note that the bits of each message are numbered in ascending order left to right, and this is the order in which the message is sent. The SERVICE subfield assignments are used in the operation of this invention. The MESSAGE CLASS subfield defines the type or source of data in the DATA field. For example, the preferred embodiment has "Discharge Air Temperature" and "Fan Switch Setting" as two of perhaps 100 different parameters whose values can be sent in a DATA field. The PR, DATA ID, and DATA LGT fields collectively and in sequence are referred to below as the "message header" or "header".

FIG. 2B shows the format of an entry of the query response list, abbreviated as QRL. As will be explained below, the QRL identifies report query messages to which nodes must reply with a report message. Each QRL entry includes two fields. One field includes the bit pattern for one particular value of a report query message DATA ID field. The other field has the bit pattern for the report message header associated with the report query message DATA ID bit pattern in the entry. The report message header in each QRL entry forms the leading bits of the report message to be sent in response to the report query message having the associated DATA ID field value. Within the DATA ID field for this embodiment, the service SVC subfield value must be 01 in every entry to cause the header to designate the message as a report message. For proper operation of this invention, it is important for each node 10, etc. properly responding to a particular report query message, to include precisely the same header bit pattern in its report message.

Node 10 is shown as a hybrid block and circuit diagram that illustrates a typical structure for each of the nodes in the FIG. 1 system. I prefer that each node 10, etc. have at least its message sending operations similar to that in every other node 10, etc. in order to assure close synchronicity in the start of individual messages. The individual nodes 10, etc. each have the AC to DC converter 19 supplying DC power at terminal PT for operating the node's electronics as well as for applying signals to data line 15 for transmitting data to other nodes 30, etc. While converter 19 is shown in a half wave configuration for simplicity, in fact a commercial embodiment of a system including this invention has a full wave rectifier providing the AC to DC conversion. It is well within the ordinary level of skill to alter the circuitry of the individual nodes 10, etc. to operate with a full wave converter 19. Further, the "Miswire" and "Indicator" applications show a specific embodiment of a full wave rectifier circuit for nodes 10, etc.

Each node 10, etc. includes a data processor DP1, etc. Each of the data processors DP1, etc. has for implementing the invention, identical software for controlling its individual node and configured as shown in the flowcharts of FIGS. 3-8. Because operation of each data processor DP1, etc. is closely tied to the AC power frequency, the software involved with managing the communication activities tends to run in close synchronicity, as will be explained in more detail. An input interface 17 converts the voltage across data line 15 and common line 14 into a logic voltage on data path DATI for data processor DP1. Resistor R11 and transistor Q1 form a transmitter 11 that controls the signal voltage applied by node 10 to data line 15. When the voltage on data path DATO provided by data processor DP1 is low (logical low), transistor Q1 cuts off and its impedance becomes very large. Resistor R11 has a value on the order of several thousand ohms, and attempts to pull data line 15 to near the voltage at terminal PT. When data processor DP1 provides a voltage on path DATO that is higher than a volt or two (logical high), transistor Q1 saturates and conducts strongly, pulling the voltage on line 15 to near 0 v.

Since transistor Q1 has a low saturated impedance, a logical high on path DATO causes transistor Q1 to pull the voltage at line 15 near 0 v. even if a large number of nodes 30, etc. connected to line 15 all have their transistors Q1 in their cut off state. Thus, a logical high on path DATO in any node 10, 30, etc. causes transistor Q1 to pull line 15 to 0 v., thereby applying the dominant bit value on line 15. All of the nodes 30, etc. with cut off transistors Q1 that may be transmitting a recessive bit value on line 15 have that recessive signal overridden by a node 10, etc. whose transistor Q1 is saturated. While transmitting a signal on path DATO, data processor DP1 monitors the signal on path DATI. If this signal on path DATO is recessive (i.e., high) while the signal on path DATI is dominant, this means that a node 30, etc. is transmitting a dominant bit value during this bit time. Each of the data processors DP1, etc. is programmed to stop further transmission of bit values when the signal on path DATI does not agree with the signal on path DATO. This process of continually testing by each transmitting node 10, 30, etc., as to whether the signal on line 15 agrees with the signal that data processor DP1 is transmitting through transmitter 11, is called arbitration. One can see that as signal transmission continues in real time, more and more of any transmitting nodes 10, 30, etc. will stop transmitting as they lose arbitration by transmitting a recessive bit while another node 10, 30, etc. is transmitting a dominant bit. Eventually, a single transmitting node 10, 30, etc. wins arbitration and it will transmit to the end of its message because there is no longer an opportunity for another node 10, 30, etc. to win arbitration during a bit time.

Sensor 35 may comprise a temperature sensor, a status detector for a device, or any other type of sensor that detects a condition within a space. For the purposes of this description, sensor 35 usually provides a numeric (in the sense of arithmetic) value. But this invention may also be used for polling a number of the nodes in a system to detect non-safety related conditions. For example, a system might poll a number of nodes to detect whether all of the zones in a controlled space are unoccupied, in order to decide whether there is a security breach or whether the temperature in all of the zones can be set to a more energy-efficient value. More commonly, the nodes read temperature or humidity values provided by sensors 35 and 35". Typically, these values are needed regularly for determining when a central HVAC unit, corresponding to controlled device 45, must run to allow local control of room temperature or humidity. The node controlling such a central HVAC unit, node 30 in FIG. 1, receives the messages from nodes 10 and 40 indicating the temperature or humidity sensed by sensors 35 and 35".

Each of these nodes 10, etc. includes a sync generator 39, 39', etc. receiving AC power from AC line 16. Sync generator 39, etc. provides a sync signal synchronized with the AC line 16 waveform to a data processor sync terminal 37, 37', etc. Each data processor DP1, etc. starts individual bit transmission times in a fixed time phase with the zero crossovers of the AC power wave. The sync generator 39, etc. in each node 10, etc. provides a logic level sync signal to terminal 37, etc. that changes state synchronously with these zero crossings. The sync generator 39, etc. in each node thus provides a sync signal whose state changes in predetermined time relationship to each zero crossing by the AC wave on AC line 16. Since each of the nodes 10, etc. has identical sync generators 37, etc., has the same delay time after the sync signal changes state to start the next bit time, and the AC power all of the nodes 10, 30, etc. receive is identically phased, each of the nodes 10, etc. will have nearly identically bit start times. This allows for unambiguous arbitration. The time between two successive zero crossings corresponds to a single bit time. All of the nodes 10, 30, 40 transmit in synchronism by reference to the zero crossings of the power wave on AC line 16. For the customary 60 Hz. power wave in the US, this means that there are 120 bit times per sec., or 8.33 msec. per bit time. There are issues involved with reading individual bit values that are outside the scope of this application. Refer to the "Miswire" and "Indicator" applications for more information relating to these issues. To implement the invention of this application, it is necessary for each data processor DP1, etc. to be synchronized with every other data processor DP1, etc. Using the AC line 16 waveform is a convenient way to impose this synchronization.

Data processors DP1, DP2, etc. are conventional devices widely available as off-the-shelf items. Each data processor DP1, DP2, etc. has an internal instruction memory IM in which the instructions whose execution control operation of the data processor DP1, etc. and the node 10, 30, etc. are stored. Typically, instruction memories IM are non-volatile, meaning that normal operations are not capable of changing the individual instructions within an instruction memory IM. Each data processor DP1, etc. also has an alterable random access memory (RAM) having a number of data storage locations, each able to store many bytes of data. Only those locations needed to implement the invention are shown in FIG. 1.

It is helpful to set out a glossary that identifies and briefly explains the purpose of each of the identified memory location or group of locations used in the software flowcharts following. Typically, a single register will comprise a number of bytes. For example, the send register SR and message assembly register MAR must each be as long as the longest possible message, or 69 bytes. The message lists are typically the length of a number of messages.

Glosssary of Processor Memory Terms

IM—instruction memory; typically part of the processor ROM.

IMR—incoming message register; the register in which the incoming messages are assembled; typically part of the data processor RAM IMC—intermessage counter; a counter active between messages and that is decremented with each sync pulse to provide a preselected number of bit times between adjacent messages IR—interrupt register; the internal processor register in which the current time to the next processor interrupt is held MAR—message assembly register; the register in which the processor assembles a message before that message is moved into the SMQ MBP—message bit pointer; the numeric index that specifies the bit position in the IMR to receive the current input bit and in the SR from which the current output bit should be taken; leftmost bit is no. 1, and designation increases by 1 for each bit location to the right QRL—query response list; the list holding the DATA ID field whose MESSAGE CLASS field values are equal to the MESSAGE CLASS field values in the report query messages to which the individual nodes are programmed to respond with a report message; each entry in the QRL holds the priority value for the PR field, the DATA ID value, and the data length value for the DATA LGT field in the report message sent in response to the identified report query message RML—report message list; the list holding report messages read from the data line, including, in this design, messages sent by the node involved if the message survives arbitration SMF—send message flag; the flag which when set indicates that the processor is actively sending a message SMQ—send message queue; the list in which all messages to be sent by the processor are stored SR—send register; the register holding the message currently being sent by the processor To restate, the purpose of the invention is to provide a mechanism allowing a plurality of nodes 10, etc. to each simultaneously and synchronously send a report message with system-wide arbitration on the report messages' DATA fields. Operation of each node 10, etc. in using these memory elements to practice the invention generally follows the following sequential steps. First one of the nodes 10, etc. determines that a report message from each of a plurality of the nodes 10, etc. is required. This determination might be based on an external condition signaled by sensor 35 or a device 45, or be time based. That node 10, etc. assembles a report query message in its MAR. After the report query message (or any message for that matter) has been assembled in the MAR, the contents of the MAR are loaded into a send message queue SMQ in the memory of that node's data processor DP1, etc.

When the priority of the report query message with respect to the other messages in the SMQ allows, the report query message is loaded into the SR. The message-sending function of the node 10, etc. starts sending the report query message on data line 15 when any message currently being sent on data path 15 is completed. It is important that the new report query message or any other message sent by another node 10, etc. be started in rigid synchronism relative to the end of the previous message. In one protocol, each node 10, etc. waits three bit times after the end of a message before attempting to send another message. Each message must start with a dominant bit, which is detected by every node 10, etc. including those having an empty SMQ. If a message is placed in the SMQ by say, node 10, at any time after a message from say, node 30 starts, node 10 delays sending any message until the message being sent concludes.

Whenever the report query message wins arbitration on data line 15, each node 10, etc. receives the report query message. Each of the nodes 10, etc. in the query group in response assembles its report message in its MAR. Each node 10, etc. loads its assembled report message into its own SMQ. It is important that each node 10, etc. delay loading its report message into its SMQ until all of the nodes 10, etc. have generated their report message, at which time all of the nodes 10, etc. should simultaneously load their report messages into their SMQs. This restriction or condition is necessary to assure that all of the nodes 10, etc. have assembled their related report message before any of the nodes 10, etc. load its report message into its SMQ. Each of the nodes 10, etc. should be programmed to assemble in response to the same report query message, a report message having the same PR, DATA ID, and DATA LGT fields. (These three fields will be referred to hereafter collectively as the message header.) This assures that all of the related report messages will eventually be sent simultaneously with one only of them (more than one if two or more have identical DATA fields) winning arbitration.

If there is more than one message in the SMQ of one or more of the nodes 10, etc. after the nodes load their report messages into their SMQs, then these nodes 10, etc. at the end of a message transmission on data line 15 will each load the one of their messages in their SMQ with the highest priority into the SR. Of course, there is no guarantee that the report message responding to a particular report query message will be simultaneously loaded in the SMQ of each of the nodes, 10, etc. However, as long as the report message in each of the nodes 10, etc. has the same message header and is present in its respective SMQ while all of the other related report messages are in their nodes' SMQs, then each of the related report messages will eventually be loaded into the SR of each of its nodes 10, etc. to be sent synchronously with all of its related report messages.

The analysis showing this to be true is as follows: Consider first the situation where one or more messages in one or more of the nodes 10, etc. has message headers whose overall priority is greater than that of the report messages. (By the term "overall priority" is meant that that message will win arbitration with respect to any of the other messages under consideration in other nodes 10, etc.) In that case, those messages with greater overall priority will win arbitration over any report messages sent simultaneously with them by other nodes 10, etc. As these messages win arbitration, they are deleted from their SMQs until every node 10, etc. having a related report message in its SMQ simultaneously loads those report messages into its SR, and one of the related report messages being sent simultaneously wins arbitration. By definition, any messages in the SMQ of any node 10, etc. having a lower overall priority than the report message will not be selected for sending until the report message has been sent, or until one of the report messages in that RMG wins arbitration. One should keep this explanation of the invention in mind while reading the explanation of the software flowcharts below.

FIGS. 3-8 are flowcharts describing the structure of software instructions whose execution cause each node 10, 30, etc. to implement the invention. Those with familiarity in the software arts realize that first, software has a specific physical existence within the data processor that executes the software, and second, that the data processor itself becomes a functional element performing the programmed function while executing the software. As to the first point, the instruction memory has a physical structure that incorporates the unique combination of software instructions loaded into and readable from the memory and thereby uniquely defines its own structure. As to the second point, while the data processor is executing the instructions for any particular function, the processor becomes for that short period of time a physical functional element executing that function. As instruction execution continues, the data processor successively becomes the physical embodiment of each of the functional elements intended by the programmer. As a set of instructions for a particular function is re-executed, the processor can become that functional element as many times as is required. From this standpoint one can easily realize that a properly programmed data processor is a physical device in which an invention can easily be implemented. A microprocessor type of data processor implementation is often preferred to discrete or special purpose hardware because of cost savings to produce, relatively easy development, and ease of modification and upgrade.

It is useful to generally discuss the flowcharts of FIGS. 3-8 and the three types of symbol boxes in them. These flowcharts describe the functions of software stored in instruction memory IM of FIG. 1 and which implements various functions of nodes 10, 30, 40, etc. including those of the invention. Each symbol box represents one or more data processor DP1, etc. instructions. The lines with arrows connecting the boxes signify the order in which the instructions symbolized by the boxes are to be executed, with the flow of instruction execution following the direction of the arrowheads. Rectangular boxes such as element 50 of FIG. 3 are activity elements. Hexagonal boxes as at 64 of FIG. 4 are decision elements and have two paths labeled "YES" and "NO" from them to two further symbol boxes. Decision element instructions test some mathematical or logical characteristic or condition. Depending on the test result, instruction execution can either continue in sequence or take a path to another symbol box specified by the results of that test. A decision element also symbolizes one or more data processor DP1, etc. instructions testing the specified condition or arithmetic or logical value and causing instruction execution to branch depending on the result of that test. Lastly, circles comprising connector elements as at 56 of FIG. 3 specify that instruction execution continue at another point in the instruction sequence without direct connection between them by lines with arrows. The letter in the circle designates the connector element at which instruction execution is to continue.

As explained above, the instructions that an activity or decision element symbolizes cause the data processor to become during execution of those instructions, the functional equivalent of a physical device that performs the stated function. Of course each functional element exists for only a short time, and during this time none of the other elements exist. However, nothing in the patent law requires all of the components of an embodiment described in a patent to simultaneously exist. Accordingly, one can describe and claim the invention using terms describing these physical devices in terms of their software equivalents.

Note there may be many different specific embodiments of these physical devices that the data processor that all provide identical functionality. We wish to include all of these possible different embodiments in the definition of our invention, and do not wish to limit ourselves to the single one shown in the flowcharts of FIGS. 3-8.

Execution of the instructions of activity element 50 in FIG. 3 starts the operation of the data processor DP1, etc. after AC power is applied across AC line 16 and common line 14. Hardware in each data processor DP1, etc. causes an interrupt or branch to the first of the instructions of element 50 when power is first received. Executing the instructions of element 50 causes the data processor DP1, etc. to initialize the random access memory locations that will store the variable parameters used in implementing the invention. Most of these parameters are defined in the glossary above. Of course, there may well be other startup and housekeeping instructions will also be executed as a part of the element 50 instructions. Since these are not related to the invention, we choose to simplify the description by taking no further notice of them.

Next the instructions of activity element 53 are executed. These set a value in the interrupt register (IR) that causes an interrupt to occur after 500 μsec. causing instruction execution to break sequence and begin with the instructions of activity element 73 (FIG. 4). In this implementation of the invention, the 500 μsec. interrupt is the basic timing event from which all other actions related to the invention proceed. The FIG. 3 flowchart shows instruction execution to transfer to connection element A 56 and to general operating functions. These operating functions to which instruction execution transfers after executing the instructions of element 53 are for the most part the varied functions of DP1, DP2, etc. that perform actions that are ancillary to the invention. These might include sensor reading, device control, alarm generation, etc. Many of these functions involve formatting within the message assembly register MAR, messages to be sent.

A word about interrupts may be helpful. As is conventional, the preferred data processor DP1, etc. has time-based interrupt capabilities. An interrupt transfers instruction execution to a new, out-of-sequence interrupt instruction address in the instruction memory. The time to elapse before the next interrupt is set by storing a time value in an interrupt register associated with the interrupt instruction address. When the stored interrupt time has elapsed, the interrupt to the interrupt address occurs and the instruction stored there is executed. Before the interrupt instruction is executed after an interrupt, the data processor saves the contents of the control and arithmetic registers and the address of next instruction to be executed in normal sequence. When the interrupted-to software functions have been completed, then typically the contents of the control and arithmetic registers are restored and instruction execution resumes at the instruction following the instruction completed immediately before the interrupt. In this way the interrupt events are transparent to the operating functions. It is important that interrupt handling instructions are completed before the next 500 μsec. interrupt. Typically there are ways to lock out interrupts temporarily, but these issues are not germane to the invention, and will not be discussed further. We assume that all of the non-operating function instructions, that is to say, the instructions symbolized by the flowchart elements shown in FIGS. 4-7, will complete their execution and return to operating function instructions before the next 500 μsec. interrupt occurs. Since the typical data processor suitable for this application executes instructions relatively quickly, this assumption is reasonable.

As explained in the "Miswire" and "Indicator" applications, the 500 μsec. interrupt is used to sample the signal level on data line 15 at 500 μsec. intervals. With the inherent bit time of 8.33 ms. that each zero crossing by a 60 Hz. power wave creates, a number of 500 μsec. interrupts occur within each bit time, allowing sufficient sampling of the voltage level within each bit time to provide a high level of accuracy in determining the value of each bit carried on data line 15.

As explained earlier, each of the data processors DP1, etc. in FIG. 1 have identical software configured as shown in FIGS. 3-8 for implementing the invention. As the instructions of FIGS. 3-8 execute, the sync signals on terminal 37 etc. are detected during each the processing of each 500 μsec. interrupt, and used to cause nearly synchronous operation of all of the data processors DP1, etc. for at least the instructions of FIGS. 4-8. Only differences in the speed of the internal clock of each data processor DP1, etc. will affect the timing of each of the instructions as they execute, and any minor deviations in clock speed will disappear as each sync signal on sync terminal 37, etc. is detected.

Instructions symbolized by the flowchart of FIG. 6 cause the data processors DP1, etc. to detect a report query message, and then each to actually assemble and place the requested report message in the SMQ for later sending. These individual report messages, each held in a different data processor DP1, etc., form the report message group (RMG) for that report query message. The report messages in a RMG should be sent according to a protocol designed to assure that all of them will be sent by all of the data processors DP1, etc. involved in perfect synchronism. Further, all of the report messages in a RMG must have identical bit values preceding the DATA field. That is, when a number of nodes 10, etc. forming a query group are sending the query group messages the header (PR, DATA ID, and DATA LGT fields) in each of the messages should have the identical bit patterns and must be transmitted in exact synchronism with each other.

This protocol assures three important results. First, the priority of each of the report messages in a RMG is identical through all of the bits preceding the DATA field, which assures that all of them will eventually be sent simultaneously without any losing arbitration until at least the first bit of the DATA field is sent. Secondly, these report messages will all win or lose arbitration simultaneously with respect to every message that is in a SMQ but is not in the particular RMG. Third, when the reports in a RMG win arbitration through the DATA LGT field, further arbitration on the individual report messages' bits will be based on the bits in the DATA fields. These results may seem to be obvious, but they are an important feature that must be grasped for the following description to be understood. When all of the nodes 10, etc. use the AC power wave on line 16 to synchronize in all of the nodes 10, etc., each of the bit times and the messages that the bit times form, then a high degree of synchronism among the report messages occurs. By causing each of the data processors DP1, etc. to follow the message selection and sending protocols, the communication system of which nodes 10, etc. form a part, can in essence become a distributed wired OR logic network, allowing only the one or more report messages in a RMG having the largest or smallest of the DATA fields to win arbitration through the end of the message.

As each 500 μsec. interrupt occurs, instruction execution transfers to activity element 60 in FIG. 4. A set of instructions symbolized by activity element 60 and essentially identical to those of element 53 resets the value in the IR to cause another interrupt to occur after 500 μsec. causing the processor to again execute the instructions of activity element 60. Then the instructions of decision element 64 are executed. These instructions test whether a sync signal on terminal 37, etc. has occurred since the 500 μsec. interrupt immediately preceding the current interrupt. If a sync signal has not occurred, this means the process of reading the current input bit is still incomplete, and instruction execution continues with the instructions of activity element 62. The element 62 instructions sample and save the value of the voltage present on the DATI, etc. line. As explained in the "Miswire" and "Indicator" applications, the DATI signal level is sampled after each 500 μsec. interrupt by each of the data processors DP1, etc., more than a dozen times per bit interval. By such frequent sampling of the individual signal levels, it is possible to determine bit values in spite of transition uncertainties between adjacent bit times and noise that may be sometimes present on data line 15. By using an averaging technique, it is possible to determine the intended voltage level within each bit interval to a very high degree of accuracy. Greater detail for this aspect of communication for the system is not necessary to adequately describe this invention. After the current DATI line voltage has been sensed and recorded, operating functions continue through connection element A 56.

Figure 5:
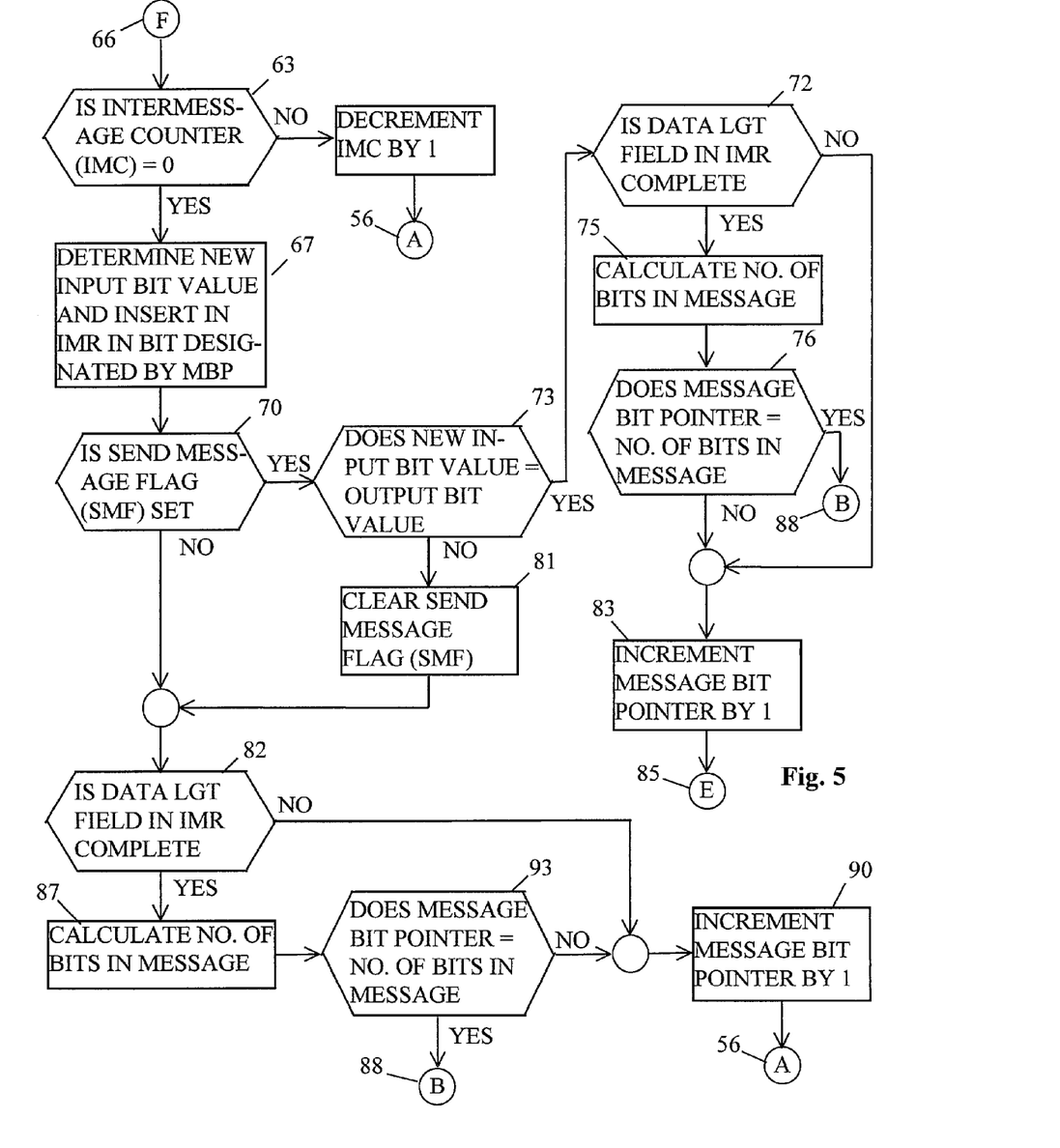
FIG. 5 representing instructions executed by a node while sending and receiving a message being sent on a data line of the system of FIG. 1.

If a sync signal was detected by decision element 64 following the most recent 500 μsec. interrupt then instruction execution continues to connector element F 66 in FIG. 5. The flowchart elements of FIG. 5 provide the read and send functions, including arbitration, of each data processor DP1, etc. These functions start with the processor DP1, etc. executing the instructions symbolized by decision element 63, which test whether the intermessage counter IMC is equal to 0. If not equal to 0, this indicates that communication activity is between messages, and the instructions of activity element 65 are executed. Element 65 instructions cause 1 to be subtracted from the IMC after which instruction execution proceeds to connection element A 56 and the operating functions.

If the IMC is equal to 0 this means that a bit of the message currently being sent has been concluded. Instruction execution continues with the instructions of activity element 67. These instructions compute the final value of the current input bit and store this value in the bit location of the IMR specified by the MBP.

Software elements 70, 73, and 81 perform actions related to the arbitration function. The instructions of decision element 70 test if the send message flag SMF is set. If the SMF is set, this means the node 10, etc. in which the instructions of element 70 are executing, is sending a message, and the most recent bit sent must be arbitrated. Decision element 73 tests whether the input bit that has just been read equals the value of the output bit that was just sent. Most conveniently, the MBP can be used to designate the bits from both the IMR and the SR to be compared. If these two bits are not equal, then the current message has lost arbitration, and the instructions of activity element 81 are executed to clear the SMF. Instruction execution then continues to decision element 93. If the current input bit does equal the current bit being sent, then the SMF should remain set and the instructions of decision element 72 are executed.

Decision element 72 tests if the DATA LGT field has been completely received. Since the DATA LGT field in this embodiment occupies bits 27 through 32, this means that the DATA LGT field is completed when the MBP≧32, so testing for this condition is the most convenient way to perform this decision. If the DATA LGT field is not complete, instruction execution branches to activity element 83, which will be discussed below.

If the DATA LGT field is complete, then activity element 75 instructions are executed next. The instructions of element 75 calculate the number of bits there will be in the current message. All of the fields in these messages have fixed length except the DATA field. By adding the known length of these fixed length fields to the variable length of the DATA field, the total length of the current message can be computed. For the specific embodiment shown, the total length of a message in number of bits is the sum of the following:

| | |
|---|---|
| header plus DATA LGT field | 32 bits |
| CRC field | 16 |
| DATA field | Contents of DATA LGT field × 8 |

This is the calculation made by element 75. Multiplying the contents of DATA LGT field by 8 can most easily be done by these small microprocessors by left shifting the contents of DATA LGT field 3 places. After the instructions of element 75 have been executed, execution continues with the instructions of decision element 76.

Decision element 76 tests to determine whether the most recent input bit ends the message. Element 76 tests the numeric value computed by the element 75 instructions to be equal to the MBP. If these values are equal, the message ends with the current bit, and in this case element 76 transfers instruction execution as indicated by connector element B 88 to decision element 72 (FIG. 6).

If the bit just concluded does not end the message (or if the DATA LGT field is not complete as tested by element 72), then the activity element 83 instructions are executed. Element 83 instructions increment the MBP by 1 to select the next bit in the SR to be sent and in the IMR to receive the next bit read. Instruction execution then transfers through connector element E 85 to activity element 84 in FIG. 7. Activity element 84 sets the voltage on the DATO path to encode the next output bit value in the SR specified by the new value of the MBP. Then instruction execution returns to the operating functions indicated by connection element A 56.

If the test by decision element 70 discussed above finds the SMF is not set, then instruction execution continues with decision element 82. Decision element 82, activity element 87, and decision element 93 are identical in purpose and function to that of decision element 72, activity element 75 and decision element 76 respectively, so there is no need to discuss them further. Elements 82, 87, and 93 simply determine whether the most recent input bit ends the message. After the activity of elements 82, 87, and 93 is complete, the instructions of activity element 90 are executed. Element 90 is identical in function to element 83. When the instructions of element 90 have been executed, instruction execution transfers through connector element A 56 to the operating functions.

Figure 6:
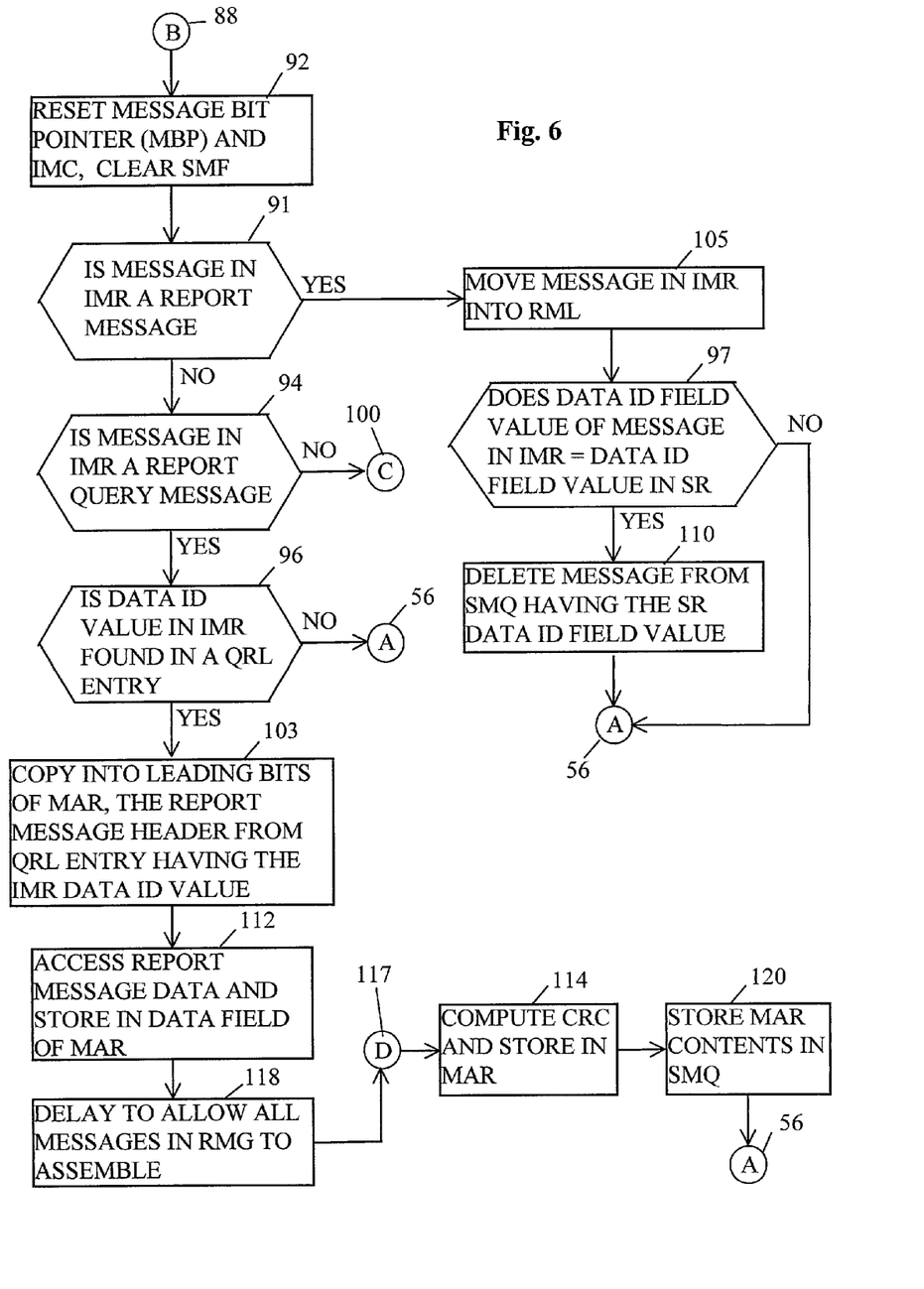
FIG. 6 is a flowchart representing instructions executed by a node while decoding and executing a command in a message being sent on a data line of the system of FIG. 1.

The two instances of connector element B 88 in FIG. 5 each transfer instruction execution to FIG. 6 and activity element 92. In FIG. 6, element 92 resets the MBP to specify the bit in the IMR designated to hold the first bit of the next incoming message and the bit in the SR if there is a message in the SMQ. Element 92 instructions also reset the intermessage (IMC) counter to specify the number of bit times between adjacent messages. In the current embodiment, that number is 3. Element 92 also clears the SMF. The remaining elements of the FIG. 6 flowchart define the software functions that interpret the incoming message whose end was just detected by the software functions of FIG. 5, and that is now held in the IMR.

The instructions of decision element 91 test whether the service subfield SVC defines the message in the IMR as a report message, that is as having a digital value=01 binary as explained in connection with FIG. 2A above. If the message in the IMR is a report message, then instruction execution continues with the instructions of activity element 105. The element 105 instructions copy the contents of the IMR to the report message list RML. The data in the messages in the RML may be used during the activities of the operating functions or may even be ignored if the information is not relevant to the operation of the particular data processor DP1, etc. To provide entries in the RML for later use, the individual entries in the RML may be erased by the operating functions after they are no longer needed, or the oldest entry may be overwritten by activity element 105. The RML typically needs only to hold perhaps a half dozen report messages at most. Report messages may stack up in the RML of the individual data processors DP1, etc. holding them if communication activity involving higher priority messages momentarily occupies the available transmitting time for the system.

After activity element 105 is complete, the instructions of decision element 97 are executed. The decision element 97 instructions test whether the DATA ID field in the message in the IMR equals the DATA ID field in the send register SR. If these two DATA ID fields are equal, instruction execution proceeds with activity element 110. When these two DATA ID fields are equal this means that the report message presently in the IMR either was the identical message being sent by the node 10, etc. involved, or was being sent by the node 10 etc. simultaneously with the message in the IMR, and lost arbitration to the message in the IMR. In either case this message must be deleted from the send message queue SMQ. The instructions of activity element 110 search the SMQ and delete the entry identical to the message in the SR query. Instruction execution then transfers to operating functions through connection element A 56.

When the decision element 91 instructions determine that the message in the incoming message register IMR is not a report message, the instructions of decision element 94 are executed next. Decision element 94 tests whether the message in the IMR is a report query message (SVC subfield=00). If the IMR does not hold a report query message, instruction execution branches through connection element C 100 to instructions symbolized in FIG. 7.

If the message in the IMR is a report query message (RQM), then the instructions of decision element 96 are executed next. Executing these instructions tests if the IMR DATA ID field is stored in the DATA ID field of an entry in the query response list QRL, see FIG. 2B. If not, instruction execution continues with the operating functions through connection element A 56. If so, the RQM in the IMR is a message to which the node 10, etc. involved, is programmed to respond with a report message. In this case, instruction execution continues with a series of activity elements starting with element 103, that assembles a report message in the message assembly register MAR to respond to the RQM in the IMR.

The reader should realize that each of the data processors DP1, etc. in the system of FIG. 1 has received this same RQM and this RQM is at essentially this instant in the IMR of each. Further, for this invention to have a useful purpose, at least two of the data processors DP1, etc. will have at this point, the identical DATA ID field value in their QRL. The two or more data processors DP1, etc. having this same DATA ID field value in their QRL will be referred to hereafter as the processor query group (PQG) for that DATA ID field value. The report messages formed by each of the data processors DP1, etc. in a PQG for a particular RQM will be referred to as a report message group (RMG). The specific PQG defined by one DATA ID field value will often have different data processors DP1, etc. as members than does the PQG for another DATA ID field value, but this is of course not required.

Activity element 103 represents instructions that copy the report message header stored in the QRL entry whose DATA ID field equals the DATA ID field in the IMR, into the leading bits of the message assembly register MAR. Then the instructions of activity element 112 are executed. Executing these instructions causes each data processor DP1, etc. to gather the data required for the DATA field of the report message under assembly in the MAR, and to store that data in the DATA field of the message in the MAR. It may be that the DATA ID field in the IMR explicitly defines the source of this data. Alternatively, the query response list QRL may have a third field that specifies the source of the data for the DATA field of the MAR. These details are simple to decide. As a practical matter, all of the sources for the DATA fields in the nodes 10, etc. whose data processors DP i, etc. are part of the PQG, should be compatible with each other. That is, the data source to be used in each node 10, etc. whose processor is in a particular PQG should be a similar sensor 35, etc. or controlled device 45. The data may be already available in the memory of the data processor DP1, etc. involved as a result of earlier actions. An example of such data may be operating status of a heating plant type of controlled device 45, or the length of time the heating plant has been operating. The present value of the specified data value is stored in the DATA field of the MAR.

As one example, this invention allows each of the nodes 10, etc. controlling a heating plant to communicate simultaneously by setting a bit in the DATA field if the heating plant that it controls is operating, that at least one heating plant is operating, although if more than one heating plant is operating, only one can be identified. In another example, the system can also simultaneously send the longest of all of the operating times of heating plants currently operating if configured to place all of the data processors controlling heating plants in a PQG. In a third example, the external sensor 35, etc. may be a temperature or other ambient condition sensor present in a number of nodes 10, etc. In such a case, each of the temperature or condition sensors provides to the associated data processor DP1, etc., a signal encoding the parameter value ambient to that sensor. The data processor DP1, etc. in that node 10, etc. are designated to form a PQG. Each of these data processors converts the sensor 35 etc. signal to a standardized digital format before storing that value in the DATA field of the processor's MAR in response to a RQM.

Activity element 118 delays further processing by the data processor DP1, etc. for a short time to accommodate the normal variations in operating speed of the various processors in the PQG in responding to the currently active RQM, by allowing all of the PQG processors to arrive at this point in preparing the report message. Passing through the connector element D 117, the instructions of activity element 114 are executed next, which compute the cyclic redundancy code and store it in the CRC field of the message in the MAR. The CRC algorithm produces a CRC value depending only on the preceding bit pattern of the message. That is, messages that are identical through the DATA field will produce identical CRC values, and hence such messages will be identical to each other through the CRC field. Computing the CRC and loading it into the CRC field completes the report message. The completed report message forming the contents of the MAR is copied into the SMQ when the data processor DP l, etc. involved executes the instructions of activity element 120. Instruction execution then transfers to operating functions through connector element A 56.

Figure 7:
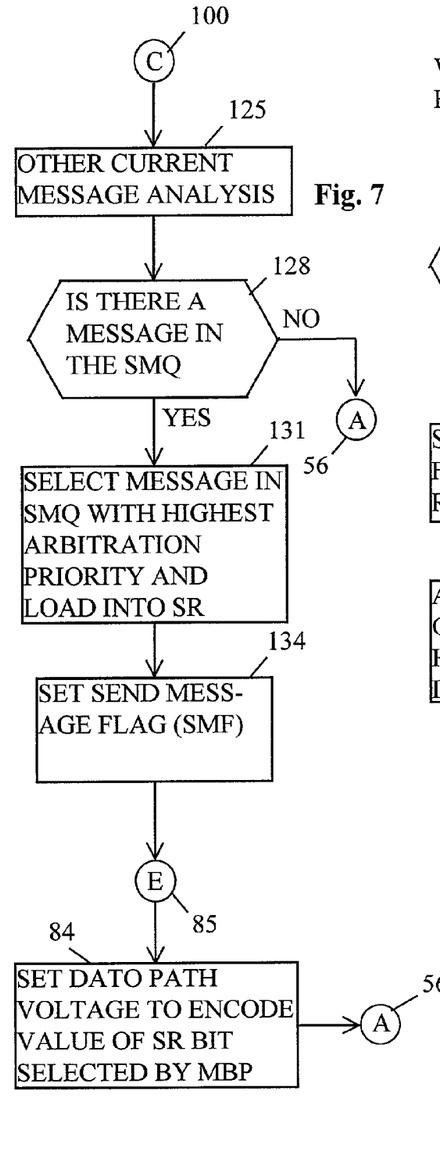
FIG. 7 is a flowchart representing instructions executed while a node is selecting a message for sending, and conditioning the node to start the message sending process.

Referring back to decision element 94, if the message in the IMR is not a report query message, instruction execution transfers to connector element C 100 and activity element 125 in the flowchart of FIG. 7. At this point message processing has determined by executing the instructions of elements 91 and 94 that the message in the IMR is neither a report message nor a report query message. The instructions represented by activity element 125 process other kinds of messages that may be generated by the nodes 10, etc. and is beyond the scope of this description. At this point in instruction execution processing of the most recently received message has been completed. The most recently received message has been completely analyzed as to type and if a report query message, the required report message has been formed and loaded into the SMQ.

Executing the remaining instructions symbolized by the flowchart of FIG. 7 selects the next message in the SMQ to be sent. The instructions of decision element 128 in each of the data processors DP1 etc. test whether there is at least one message in the associated SMQ. If the SMQ is empty in a particular data processor DP1, instruction execution continues in that data processor DP1 etc. with operating functions through connector element A 56.

If there is only one message in the SMQ of a data processor DP1, etc., this message will be selected by execution of the instructions of activity element 131. If more than one message is in the SMQ, then element 131 determines which of the messages in the SMQ has the highest priority and selects that message to load into the SR. We strongly prefer that the message selection algorithm conform to the message arbitration algorithm, and we call that arbitration-based message selection. By that we mean that if all of the messages in the SMQ of a single node 10, etc. were to be transmitted simultaneously by different ones of the nodes 10, etc., the message that would survive arbitration in message transmission is the message that should be chosen to be sent next. With an arbitration algorithm making binary 1 the dominant bit value, the message whose numeric value is largest when all of the messages in the SMQ are treated as numeric values, is the message that should be selected. A corollary is that if binary 0 is the dominant bit value for arbitration purposes, the message in the SMQ that should be selected for transmission next is that having the numerically smallest value.

The reason we prefer arbitration-based message selection is as follows. When arbitration-based message selection is used by each of the nodes 10, etc., then if a particular message, say message 1, is selected by one of the nodes 10, etc. and other messages are selected by other nodes 10, etc., to be sent simultaneously, then one of three relationships exist between message 1 and each of the other messages. Either i) the other message is in message 1's RMG (i.e., the two messages' headers are identical), or ii) the other message is not in message 1's RMG and will win arbitration by the end of the header when both are sent simultaneously, or iii) the other message is not in message 1's RMG and will lose arbitration by the end of the header when both are sent simultaneously. Recall that by definition, all report messages in every one of the data processors DP1, etc., and that have identical report message headers are in the same RMG, and differ only in their data field-related values. Each of the other messages having relationship ii) to message 1 will win arbitration against both message 1 and all other messages in message 1's RMG that have been sent simultaneously. Each of the other messages having relationship iii) to message 1 will lose arbitration against both message 1 and all other messages in message 1's RMG that have been sent simultaneously.

But this is also true for every one of the messages in every one of the nodes 10, etc. Thus, one can see that eventually all of the messages that will win arbitration with any of the messages in a particular RMG will while being sent, win arbitration over every message in that RMG. After having been sent to completion, these messages will be removed from the SMQ in their nodes 10, etc. When all of these messages have been sent, then each and every message in the particular RMG will win arbitration through the end of their identical headers at the same time. Thereafter, the various messages in the RMG will arbitrate among themselves on the basis of their DATA fields until one remains active and is sent to completion. All of the messages in the particular RMG will then be removed from their nodes' SMQs at nearly the same time, see elements 97 and 110 of FIG. 6. Thus, by using arbitration-based message selection, eventually all of the messages in an RMG will simultaneously be sent irrespective of the presence of other messages in any of the nodes' SMQs. The message is then loaded into the SR.

Then the instructions of activity element 134 are executed, which set the SMF to indicate that an active message is present in the SR and which reset the MBP. Recall that the SMF is tested by decision element 70 in FIG. 4. The MBP is set to select the leading bit of the SR.

The instructions of activity element 84 are executed next which, as was explained in connection with FIG. 5, set the DATO path voltage to encode the value of the SR bit selected by the MBP. Of course, if the SR bit selected by the MBP is r4ecessive, the actual data line carries the dominant bit value. Once this specified DATO path voltage has been set, execution continues with the operating functions through connector element A 56.

Figure 8:
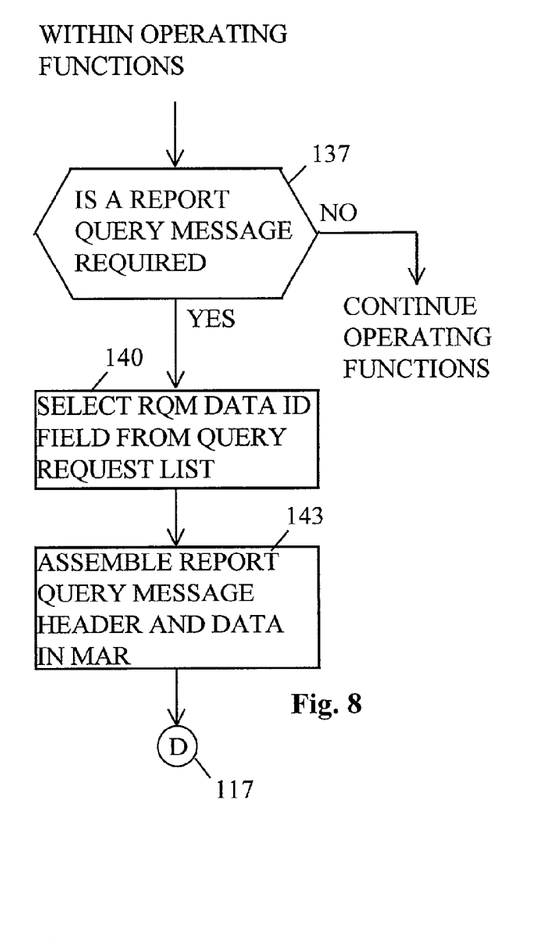
FIG. 8 is a flowchart representing instructions executed by a node in assembling a report query message.

FIG. 8 shows generic software elements for determining or detecting the need for a report query message and for generating a report query message once the need is established. These elements will typically be placed within or form a part of the operating functions, and may appear at a number of different places within the operating functions. As such, these elements are typically not incorporated in the module for generating and processing report messages previously described. The various criteria establishing need for report query messages depend on the particular system application involved and are beyond the scope of this invention. Testing any or all of the various criteria establishing the need for a report query message is symbolized by the decision element 137. If there is no need for a report query message, then instruction execution continues with other operating functions. When the operating functions determine need for a report query message, the instructions of activity element 140 are executed. These select the proper report query message from the query request list. The instructions of activity element 143 assemble the report query message in the MAR and transfers execution to the instructions of activity element 114 in FIG. 6. These instructions add the assembled RQM to the SMQ where in due course, the message will be selected and sent. Since a RQM typically should have a high priority, the PRIORITY field should appropriately reflect this status.

The preceding discussion is sufficient for someone with skill in data communication technology to understand and practice the invention. Such a person will also understand that there are a great many variations to the embodiment disclosed here that incorporate the concepts defined by the following claims. We wish to incorporate all of these variants in the matter to be protected.

I claim:

1. In a system of at least first and second nodes for sending data on a shared serial data path, each using dominant and recessive signals to encode bit values, each said node having a send register recording the bits of a message to be sent, and a message-sending module responsive to a send signal, sending on the data path during successive bit intervals the signal values specified by bit values in sequential bit positions of the send register, where a dominant signal level sent on the data path by any node during a bit interval creates a dominant signal level on the data path during that bit interval irrespective of the number of recessive signal levels sent by other nodes, wherein each node while sending senses the signal level on the data path during each bit interval, and if the sensed signal level differs from that sent by that node, halts further sending of signal levels by that node, wherein each of at least first and second nodes generates a data signal associated with that node that represents a node data value, said system including a report query module providing a report query message signal to each of the first and second nodes, said report query message signal representing a query data field having a value specifying a report message header value;

and wherein the at least first and second nodes each include:

i) a message assembly register for receiving bit patterns;

ii) a message-generating module receiving the report query message signal and the associated data signal and forming therefrom in the message assembly register a report message having as leading bits thereof a report message header specified by the query data field in the report query message signal, each of the at least first and second nodes providing an identical report message header responsive to a particular query data field value, and as low order bits thereof a series of bits representing the node data value in the data signal generated by the node involved;

iii) a message-synchronizing module providing a synchronizing signal on the data path;

iv) a message selection module copying a message assembled in the message assembly register into the send register, and responsive to the synchronizing signal, providing the send signal to the message-sending module;

v) a memory for holding a) a query response list having a plurality of entries and b) a send message queue having a plurality of messages, wherein each of the entries includes a query data field value in association with a report message header value, and wherein the message-generating module further includes an element 1) receiving the report query message signal and searching the query response list for a query data field value equaling the query data field value encoded in the report query message signal, and 2) forming a report message in the message assembly register having the report message header associated in the query response list with the query data field value encoded in the report query message signal, wherein the message generating module stores in the send message queue the contents of the message assembly register upon forming a report message therein, and wherein the message selection module selects individual messages from the send message queue, copies selected messages into the send register, and responsive to a synchronizing signal occurring thereafter, provides the send signal to the message sending module;

vi) a message-receiving module receiving the signal levels on the data path and from them forming individual incoming bit values, from the incoming bit values detecting the end of each message, and responsive to detecting the end of a message, providing the synchronizing signal;

vi) an incoming message register having a plurality of sequential bit locations, and wherein the message-receiving module further comprises elements:

a) recording sequential incoming bit values in sequential bit locations of the incoming message register; and b) determining whether the message in the incoming message register is a report message, and if a report message, comparing the report message header portion of the message in the incoming message register with the report message header portion in the send register, and if the two header portions are equal, deleting the message in the send message queue that was copied into the send register.

2. The system of claim 1, wherein each message selection module includes an element employing arbitration-based message selection to select messages to copy into the send register.

3. The system of claim 2 wherein each element employing arbitration-based message selection selects messages in the send message queue whose numeric value is largest when all of the messages in the send message queue are treated as numeric values.

4. The system of claim 2 wherein each element employing arbitration-based message selection selects messages in the send message queue whose numeric value is smallest when all of the messages in the send message queue are treated as numeric values.

5. The system of claim 1, wherein each message-synchronizing module comprises an end-of-message detector in electrical connection to the data path and providing the synchronizing signal responsive to the end of each message.

6. A method for operating a system of at least first and second nodes for sending data on a shared serial data path, each using dominant and recessive signals to encode bit values, each said node having a send register recording the bits of a message to be sent, and a message-sending module responsive to a send signal, sending on the data path during successive bit intervals the signal values specified by bit values in sequential bit positions of the send register, where a dominant signal level sent on the data path by any node during a bit interval creates a dominant signal level on the data path during that bit interval irrespective of the number of recessive signal levels sent by other nodes, wherein each node while sending senses the signal level on the data path during each bit interval, and if the sensed signal level differs from that sent by that node, halts further sending of signal levels by that node, wherein each of at least first and second nodes generates a data signal associated with that node that represents a node data value, said system including a report query module providing a report query message signal to each of the first and second nodes, said report query message signal representing a query data field having a value specifying a report message header value;

and wherein the at least first and second nodes each perform the steps of:
 i) receiving the report query message signal and the associated data signal and forming therefrom in a message assembly register a report message having as leading bits thereof a report message header specified by the query data field in the report query message signal, each of the at least first and second nodes providing an identical report message header responsive to a particular query data field value, and as low order bits thereof a series of bits representing the node data value in the data signal generated by the node involved;
 ii) providing a synchronizing signal on the data path; and
 iii) copying a message assembled in the message assembly register into the send register, and responsive to the synchronizing signal, providing the send signal to the message-sending module;
 iv) recording a query response list having a plurality of entries, each entry including a query data field value in association with a report message header value;
 v) receiving the report query message signal;
 vi) searching the query response list for a query data field value equaling the query data field value encoded in the report query message signal;
 vii) forming a report message in the message assembly register having the report message header associated in the query response list with the query data field value encoded in the report query message signal
 viii) storing in a send message queue the contents of the message assembly register upon forming a report message therein;
 ix) copying selected messages from the send message queue into the send register; and
 x) responsive to a synchronizing signal occurring thereafter, providing the send signal to the message sending module;
 xi) recording sequential incoming bit values in sequential bit locations of an incoming message register; and
 xii) testing whether the message in the incoming message register is a report message, and if a report message, comparing the report message header portion of the message in the incoming message register with the report message header portion in the send register, and if the two header portions are equal, deleting the message in the send message queue that was last copied into the send register.

7. The method of claim 6, including in each of the at least first and second nodes, the step of selecting messages to copy into the send register using an arbitration-based message selection criterion.

8. The method of claim 7 wherein the arbitration-based message selection step includes selecting messages in the send message queue whose numeric value is largest when all of the messages in the send message queue are treated as numeric values.

9. The method of claim 7 wherein the arbitration-based message selection step includes selecting messages in the send message queue whose numeric value is smallest when all of the messages in the send message queue are treated as numeric values.

10. The method of claim 6, further comprising in each of the at least first and second nodes the steps of receiving the signal levels on the data path and from them forming individual incoming bit values, from the incoming bit values detecting the end of each message, and responsive to detecting the end of a message, providing the synchronizing signal.

* * * * *